UNITED STATES PATENT OFFICE.

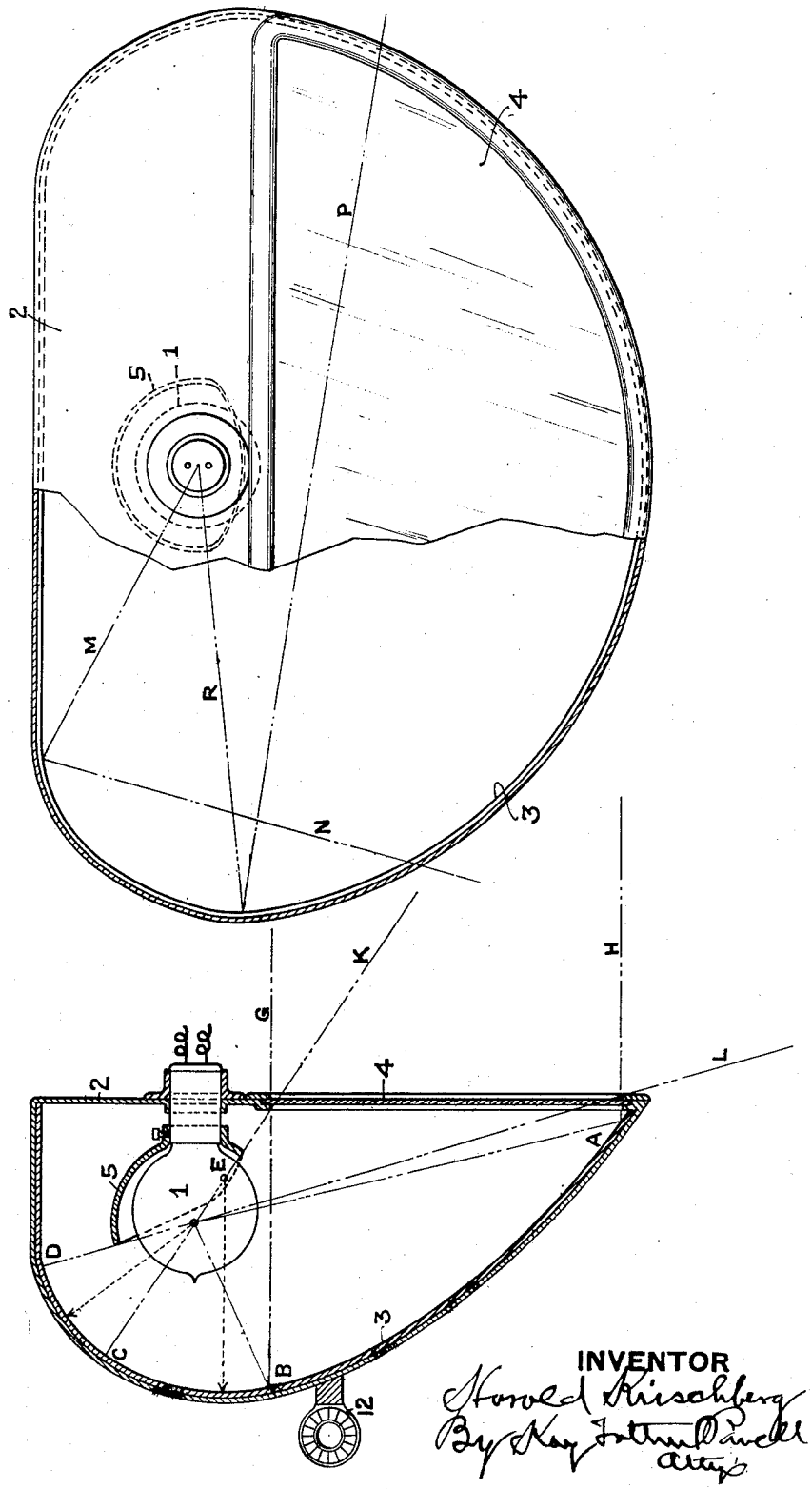

HAROLD KIRSCHBERG, OF PITTSBURGH, PENNSYLVANIA.

LIGHT-PROJECTOR.

1,393,027.   Specification of Letters Patent.   Patented Oct. 11, 1921.

Application filed December 18, 1916. Serial No. 137,650.

*To all whom it may concern:*

Be it known that I, HAROLD KIRSCHBERG, a citizen of the United States, and resident of Pittsburgh, in the county of Allegheny and State of Pennsylvania, have invented a new and useful Improvement in Light-Projectors; and I do hereby declare the following to be a full, clear, and exact description thereof.

My invention relates to "light projectors" such as automobile headlights, locomotive headlights, spot lights, flood lights, etc.

Its object is to control the form and intensity values of the projected beam by the reflection of all, or part of, the light from the primary source while hiding the entire primary source of light and its accessories from view.

To these ends my invention comprises the novel features hereinafter set forth and claimed.

In the accompanying drawing, Figure 1 is a vertical section of a projector embodying my invention, and Fig. 2 is a face view, partly broken away, of the same.

The light projector is supported in any suitable casing as illustrated; the primary light source 1 illustrated as an electric lamp bulb is inclosed in an opaque chamber 2 of the main casing; the casing body also supporting the reflector 3 and having a transparent lens 4 extending from the base of the reflector upwardly to the opaque casing. Back of the light source is the secondary reflector 5 which is so designed as to receive the light which would not strike upon the main reflector and direct it back through the center of the light source to the main reflector 3, the light being then united with the main beams projected by the main reflector 3. This secondary illustrated reflector 5 is circular in regard to the center of the light.

The portion of the primary reflector illustrated as the section A, B is in this illustration formed on a parabolic curve with the center of the light source in the focus so that the light beams striking the same are projected horizontally in said figure, forming a horizontal parallel beam G, H. The section B C is on a circular curve from the radius point E and the light striking such section will be projected in a divergent beam between the lines G and K thus lighting the ground a little ahead of the car; and the light striking C D which is formed on a circular curve with a limiting line passing through the source of light and perpendicular to the axis of the parabolic curve A—B, the center of said curve being the center of the light, will be projected between the lines K and L and these beams will light the ground immediately in front of the car.

The light passing from the light source itself in a downward direction between the dotted lines K and L, passes from the light source directly without being reflected. When the lamp illustrated is used as a headlight for either automobile or locomotive work, it is evident that as the primary source of light is entirely hidden, there will be no light projected above the horizontal, thereby reducing the glare and causing all of the light in the beam to be distributed in useful directions. The beam may also be properly controlled laterally to any desired form by varying the curvature of the reflector, for example, in Fig. 2, the lower portion of the reflector is illustrated as parabolic and the beams therefrom will be thrown in a parallel direction corresponding to that from the section A B in Fig. 1. The upper portion of the reflector is made to spread the light in a downward lateral direction, for instance, to illuminate the ground before and beside the car. For example, the light rays along the dotted lines M and R will be projected laterally along the lines N and P, and according to the curvature of the reflector the light will be spread down. Of course, the lines of reflection may vary as desired and for the purpose intended, and may or may not be symmetrical in any plane as required.

The reflector illustrated is intended for automobile use, and the beams of light may be thrown in different directions by the varying of the curvature as desired. For general purposes, I prefer to support the reflector on a horizontal bearing as at 12 so that according to the desire of the user, the reflector may be tilted in one direction or the other and adjusted and held in one position. Such tilting, however, will slightly vary the direction of the beams from the reflector. I am able by my invention to control the direction of all the beams of light.

What I claim is:

A light projector having a source of light, a primary reflector having a parabolic curve entirely below the source of light, and having a plurality of generated curves extending up from the first-named parabolic curve to a limiting line passing through the source of light and perpendicular to the axis of said parabolic curve, whereby the rays reflected by these generated curves are redirected below said axis and out of the reflector, and a secondary reflector forming a screen to shut off all upwardly directed rays from said source of light except such rays as would normally fall on the primary reflector and redirecting such rays on to said primary reflector.

In testimony whereof I, the said HAROLD KIRSCHBERG, have hereunto set my hand.

HAROLD KIRSCHBERG.

Witnesses:
   JOHN F. WILL,
   J. R. KELLER.